No. 744,210. PATENTED NOV. 17, 1903.
G. LAGAEHE.
TIRE FOR VEHICLE WHEELS.
APPLICATION FILED JULY 13, 1903.
NO MODEL.
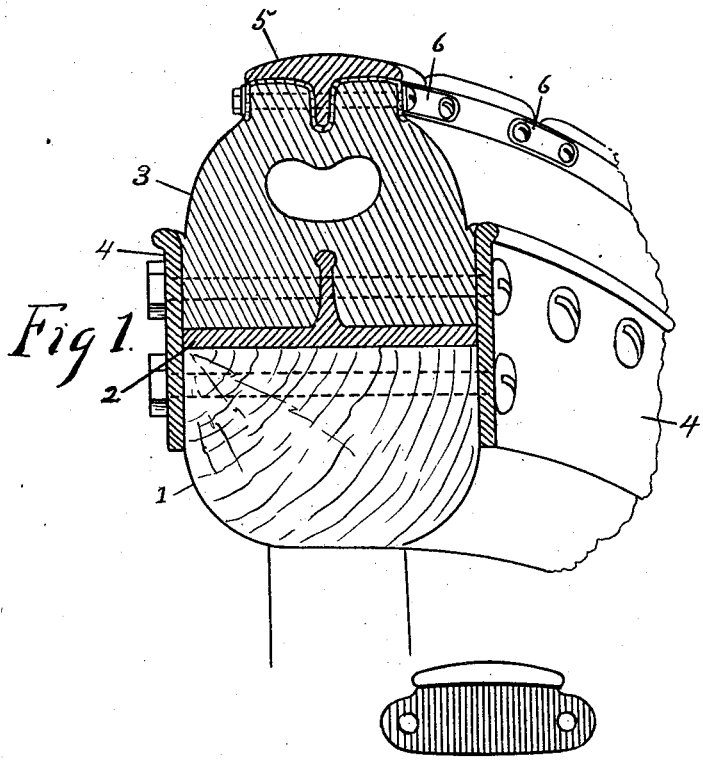
Witnesses: Fig 2. Inventor:

No. 744,210. Patented November 17, 1903.

UNITED STATES PATENT OFFICE.

GEORGE LAGAEHE, OF AKRON, OHIO.

TIRE FOR VEHICLE-WHEELS.

SPECIFICATION forming part of Letters Patent No. 744,210, dated November 17, 1903.

Application filed July 13, 1903. Serial No. 165,222. (No model.)

*To all whom it may concern:*

Be it known that I, GEORGE LAGAEHE, a citizen of the United States, residing at Akron, in the county of Summit and State of Ohio, have invented certain new and useful Improvements in Tires for Vehicle-Wheels; and I do hereby declare the following to be a full, clear, and exact description of the same, reference being had to the accompanying drawings, forming a part of this specification, and to the figures of reference marked thereon.

This invention relates to improvements in vehicle-tires having a combination elastic and metallic tread, and particularly to that class wherein the rubber or elastic tire is secured in a channel wheel-rim.

To the above ends the invention consists in certain novel details of construction and combination of parts, all as will be shown and described in the appended claim.

In the accompanying drawings, Figure 1 is a cross-section view of a wheel-rim with the combination metal and elastic tire secured thereto. Fig. 2 is a detail of a metallic piece T shape in cross-section.

Fig. 1 in the drawings indicates the felly of the wheel, which may be of any ordinary construction and forms no part of this invention. The rim 2, preferably of metal, is secured to the wheel in any preferred manner and has an upwardly-extending flange at the center thereof. The tire 3, of any desired or preferred shape in cross-section, is preferably rubber and has in the center at the base-line a longitudinally-extending groove or channel made to conform and rest on the rim 2. The metal side plates 4 4 overlap a portion of the felly 1 and the elastic tire 3. Transverse bolts spaced at intervals pass through the felly, side plates, elastic band, and the web of the T-shaped metallic band, thereby holding them securely together. The metallic piece 5 has a downwardly-extending flange made to conform and fit into a longitudinally-extending groove cut on the tread of the elastic tire 3 and lateral projections extending flush with the sides of the tire 3. The side links 6, preferably of metal, are secured by rivets passing through the elastic tire and the downwardly-extending flange of the T-shaped metallic piece 5.

Difficulty has been found in elastic tires because of their tendency to wear on the tread portion. It can be readily seen that by fastening metallic pieces spaced at intervals on the tread of the tire the tendency to slip and wear out is eliminated. Great difficulty has also been found in tires creeping in the channel or rim, thereby rendering them useless. It will be seen readily that by fastening in the manner and form as described that that difficulty will be overcome.

Having thus described my invention, what I claim as new, and desire to secure by Letters Patent, is—

In a vehicle-wheel, the combination with the metallic rim T-shaped in cross-section with oppositely-disposed annular side plates; of an elastic tire having a sectional metallic tread portion T-shaped in cross-section spaced at intervals thereon, with the webs thereof extending into a portion of the tire, the lateral projections extending flush with the sides thereof, and oppositely-disposed side links or plates connecting the metallic tread portions, and means for removably securing the side links and the metallic tread portions to the elastic tire, substantially as shown and described.

GEORGE LAGAEHE.

Witnesses:
H. J. SAUNDERS,
CHARLES MOTZ.